United States Patent [19]
Boer et al.

[11] Patent Number: 5,987,033
[45] Date of Patent: Nov. 16, 1999

[54] WIRELESS LAN WITH ENHANCED CAPTURE PROVISION

[75] Inventors: Jan Boer, Odijk; Hendrik van Bokhorst, Nijkerk; Wilhelmus Josephus Diepstraten, Diessen; Adriaan Kamerman, Nieuwegein; Rienk Mud, Wijk bij Duurstede; Hans van Driest, Bilthoven; Robert John Kopmeiners, Hengelo, all of Netherlands

[73] Assignee: Lucent Technologies, Inc., Murray Hill, N.J.

[21] Appl. No.: 08/925,416

[22] Filed: Sep. 8, 1997

[51] Int. Cl.[6] .......................... H04B 7/00; H04L 12/413; H04Q 7/00
[52] U.S. Cl. .......................... 370/445; 370/313; 370/349
[58] Field of Search .................................... 370/338, 445, 370/447, 448, 461, 462, 332, 313, 349

[56] References Cited

U.S. PATENT DOCUMENTS

| | | | |
|---|---|---|---|
| 4,611,334 | 9/1986 | Engel et al. | 375/100 |
| 5,164,942 | 11/1992 | Kamerman et al. | 370/94.1 |
| 5,220,564 | 6/1993 | Tuch et al. | 370/338 |
| 5,369,639 | 11/1994 | Kamerman et al. | 370/85.3 |
| 5,422,887 | 6/1995 | Diepstraten et al. | 370/85.3 |
| 5,502,724 | 3/1996 | Chen et al. | 370/85.3 |
| 5,515,035 | 5/1996 | Gut | 340/825.5 |
| 5,553,316 | 9/1996 | Diepstraten et al. | 455/69 |
| 5,638,449 | 6/1997 | Jacquet et al. | 370/447 |
| 5,657,326 | 8/1997 | Burns et al. | 370/445 |
| 5,721,733 | 2/1998 | Wang et al. | 370/332 |

OTHER PUBLICATIONS

Kamerman, Ad, et al.; WaveLAN–II, A High–Performance Wireless LAN for the Unlicensed Band; Bell Labs Technical Journal, Summer, 1997; pp. 118–133.

*Primary Examiner*—Hassan Kizou
*Assistant Examiner*—John Pezzlo

[57] ABSTRACT

A receiver, and a method for operating the receiver, for a station in a wireless local area network using a common wireless communication channel and employing a CSMA/CA (carrier sense multiple access with collision avoidance) protocol includes various modes. In normal mode, the receiver follows typical states in order to detect a message and demodulate data from the message properly. Meanwhile, a process implements a message-in-message (MIM) mode when an energy increase above a specified level is detected. While in the MIM mode, if a carrier is detected, the energy increase is caused by a new message; otherwise, the energy increase is caused by an interfering station. If the carrier is detected, the receiver begins retraining so that it can start receiving the new message as soon as the first message ends. If no carrier is detected, the receiver waits a specified time to detect a carrier or for the end of the first message, after which the receiver returns to the beginning of the normal mode. While in the normal mode, if a message is detected that is not addressed to the station, the receiver enters a hunt mode. While in the hunt mode, the receiver waits for the current message to finish. At the same time, a process implements retraining when both an energy increase above a specified level and a carrier are detected. If no carrier is detected within a specified time, or if the energy level decreases below the specified level, the receiver returns to the beginning of the normal mode.

4 Claims, 9 Drawing Sheets

WIRELESS LAN WITH ENHANCED CAPTURE PROVISION

FIELD OF THE INVENTION

The invention pertains to the field of wireless local area networks (LANs), and in particular, to a wireless LAN with an enhanced retrain control function to enhance the capture provision of a station in receive mode.

BACKGROUND OF THE INVENTION

Wireless LANs are usually based on a medium access control (MAC) using a listen-before-talk scheme like carrier sense multiple access with collision avoidance (CSMA/CA) as described by the IEEE 802.11 standard. Such a scheme allows a station to start a transmission when there is no transmission active that is being received above a certain threshold level.

The IEEE 802.11 standard for wireless LANs is a standard for systems that operate in the 2,400–2,483.5 MHz industrial, scientific and medical (ISM) band. The ISM band is available worldwide and allows unlicensed operation for spread spectrum systems. IEEE 802.11 focuses on the MAC and physical layer (PHY) protocols for access point based networks and ad-hoc networks. IEEE 802.11 supports direct sequence spread spectrum (DSSS) with differential encoded BPSK and QPSK, frequency hopping spread spectrum (FHSS) with Gaussian FSK (GFSK), and infrared with pulse position modulation (PPM).

Figure 1:
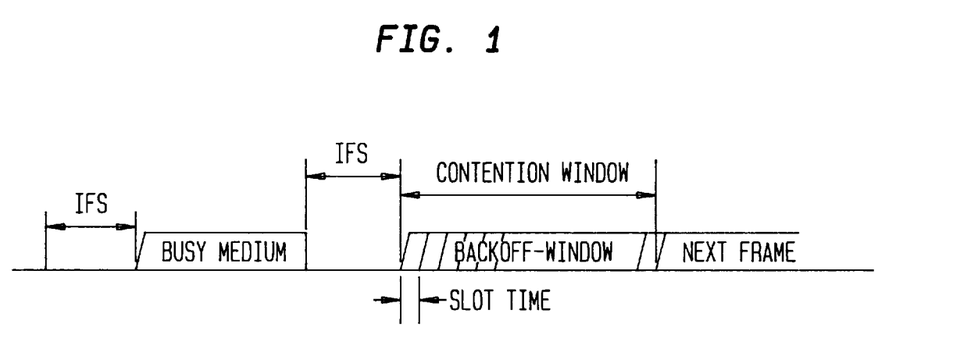
FIG. 1 shows basic CSMA/CA behavior of a transceiver in a wireless LAN.

The basic medium access behavior allows interoperability between compatible physical layer protocols through the use of both CSMA/CA and a random backoff time following a busy medium condition. In addition, all directed traffic uses immediate positive acknowledgment (ACK frame), where retransmission is scheduled by the sender if no ACK is received. The CSMA/CA protocol is designed to reduce the collision probability between multiple stations accessing the medium at the point where they would most likely occur. The highest probability of a collision occurs at the moment in time that is just after the medium becomes free following a busy medium, because multiple stations are waiting for the medium to become available. Therefore, a random backoff arrangement is used to resolve medium contention conflicts. Basic CSMA/CA medium access control scheme behavior is shown in FIG. 1. IFS stands for Inter Frame Spacing.

However, the MAC cannot always prevent the occurrence of co-channel transmissions that overlap in time due to position dependent receive level variations or limited margins with respect to the carrier sense/defer threshold.

SUMMARY OF THE INVENTION

Briefly stated, a receiver for a station in a wireless local area network using a common wireless communication channel and employing a CSMA/CA (carrier sense multiple access with collision avoidance) protocol includes various modes. In normal mode, the receiver follows typical states in order to detect a message and demodulate data from the message properly. Meanwhile, a process implements a message-in-message (MIM) mode when an energy increase above a specified level is detected. While in the MIM mode, if a carrier is detected, the energy increase is caused by a new message; otherwise, the energy increase is caused by an interfering station. If the carrier is detected, the receiver begins retraining so that it can start receiving the new message as soon as the first message ends. If no carrier is detected, the receiver waits a specified time to detect a carrier or for the end of the first message, after which the receiver returns to the beginning of the normal mode. While in the normal mode, if a message is detected that is not addressed to the station, the receiver enters a hunt mode. While in the hunt mode, the receiver waits for the current message to finish. At the same time, a process implements retraining when both an energy increase above a specified level and a carrier are detected. If no carrier is detected within a specified time, or if the energy level decreases below the specified level, the receiver returns to the beginning of the normal mode.

DESCRIPTION OF THE PREFERRED EMBODIMENT

The performance of transceiver systems is normally characterized by limitations in relation to noise and to different kinds of interference, such as intersymbol interference (ISI), adjacent-channel interference, and co-channel interference. The noise limitation relates to the power budget parameters such as transmitter output power, antenna gain, isotropic loss, path loss including multipath fading, man-made noise, receiver degradation (noise factor and implementation loss) and the required SNR (signal to noise ratio) for the modulation in question. Intersymbol interference is caused by the impulse response of the air-channel and partially by imperfections in the transmitter and receiver circuitry (filtering). Adjacent-channel interference is related to filtering and channel shaping conditions such as the spectrum of modulated signal. At non-constant envelope modulation, sideband regeneration by non-linearity in the transmitter power amplifier occurs. Co-channel interference relates to medium reuse conditions. The capture effect properties in relation to the desired and unwanted signal are crucial for the medium reuse.

Indoor propagation is analyzed using path loss based on distance because of simplicity. However, for cell planning and the installation of access points the ray tracing approach is very useful for the prediction of the path loss between access points. The formula below illustrates the various path loss contributions in an indoor environment. In addition to path loss caused by distance, large-scale variations and small-scale fluctuations occur in a multipath fading environment.

$$L = L_0 + 10\gamma_0 \log\left(\frac{\lambda}{4\pi d_{ref}}\right) + 10\gamma \log\left(\frac{d}{d_{ref}}\right) + \ldots + \sum_{i=0}^{I} N_i^F L_i^F + \sum_{j=0}^{J} N_j^W L_j^W + gd$$

where $L_0$=antenna gain/loss (for dipole −2 dB), $\lambda$=wavelength, $d_{ref}$=reference distance from transmitter, d=transmitter-receiver distance, $\gamma_0$=decay exponent below $d_{ref}$ (up to 5 or 10 meter $\gamma_0$=2), $\gamma$=decay exponent above $d_{ref}$, $N_i^F$=number of floors of the i'th category, $L_i^F$=loss due to i'th floor category, $N_j^W$=number of walls of j'th category, $L_j^W$=loss due to j'th wall category, and g=(linear) decay rate.

The second term of the above formula gives the isotropic loss with respect to the reference distance. At 2.4 GHz this loss with respect to 1 meter is 40 dB. The third term is the exponential path loss term; common decay exponents for indoor environments are 2 through 6, meaning 6 dB through 18 dB loss per distance doubling. The value of the decay exponent also depends on taking other loss terms into account. The fourth term characterizes loss by floors. The fifth term characterizes loss by walls. The sixth term gives a loss that is linear with respect to distance with common values for this indoor loss at from 0.2–0.6 dB/m in combination with the decay exponent equal to the decay exponent for free space propagation ($\gamma$=2).

Figure 2:
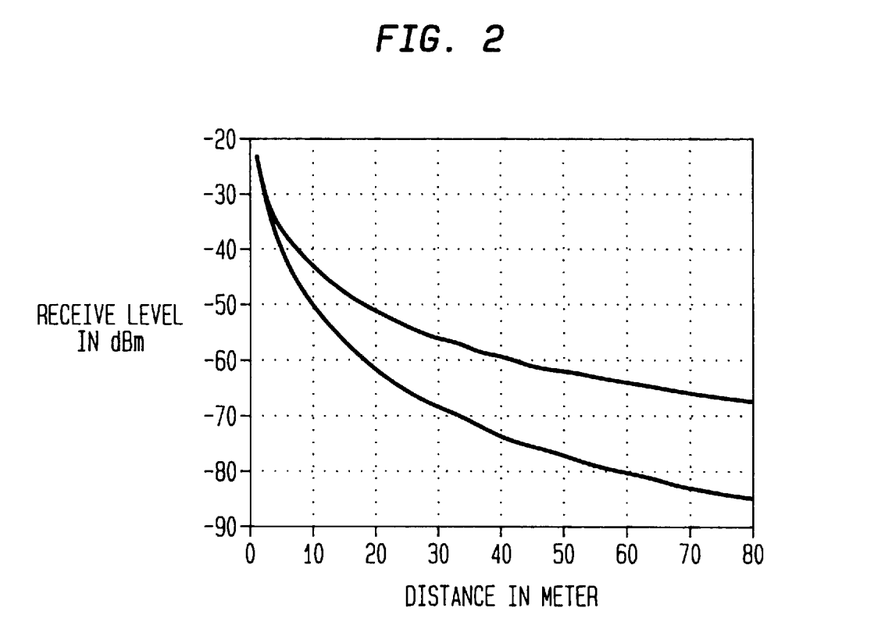
FIG. 2 shows a variation of receive levels vs. distance characterized by exponential path loss for typical indoor environments.

FIG. 2 shows the variation of receive levels vs. distance, which is characterized by an exponential path loss for typical indoor environments such as an office, warehouse, or supermarket. The transmit power level is here 17 dBm and the isotropic loss (with respect to 1 meter) is 40 dB.

Figure 3A:
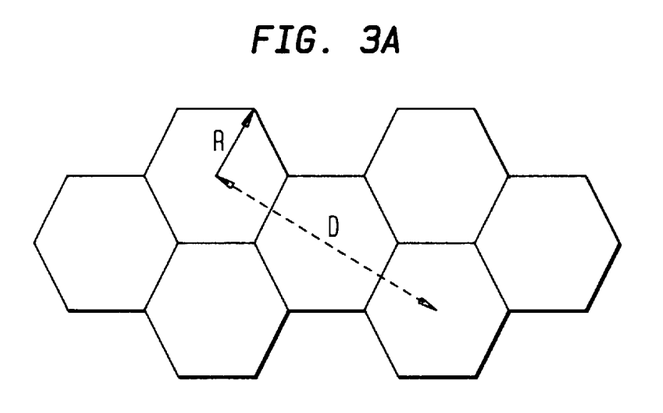
FIG. 3A shows an illustration of medium reuse distance.

Referring to FIG. 3A, an illustration of medium reuse distance is shown. Cells are shown as hexagons with a radius R. A distance D is the distance between the cell base stations being examined for interference. When neighbor cell systems use different channels, then network cell systems that are further away can reuse the same channel again as long as interference from the further away cell systems is limited. If reuse of the same channel is allowed within another cell at distance D, then the co-channel reduction factor a=(D/R) is used as a key parameter dealing with co-channel interference.

Figure 3B:
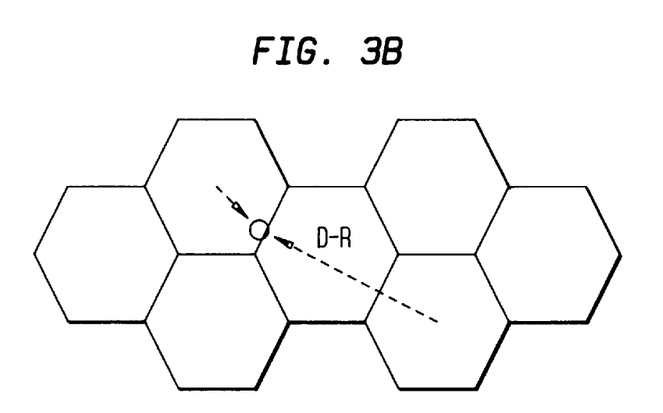
FIG. 3B shows an illustration of worst case interference distance for cellular telephone systems.

Referring to FIG. 3B, a worst case interference distance for cellular telephone systems is shown. Separate channels are used for the uplink and downlink. The co-channel interference contributions from neighbor cells are permanently present. Since there are separate channels for the uplink and the downlink, the co-channel interference contributions are either all based on uplink or all based on downlink. For analog FM cellular systems, it is usually assumed that the combined co-channel interference from six neighbor cells may not exceed a CSIR (co-channel signal to interference ratio) of 18 dB. Furthermore, it is also usually assumed that the total of the six contributions corresponds to six times the average case contribution based on the co-channel reduction factor a=(D/R). The MRE (medium reuse efficiency) is defined as the cell area over the area assigned for a single channel. This implies that $$MRE = \left(\frac{R}{D}\right)^2 \text{ where } \frac{1}{6}\left(\frac{D}{R}\right)^\gamma \geq 10^{1.8}$$

based on a CSIR=18 dB.

Significant differences exist between cellular telephone systems as discussed above and indoor wireless LANs. LAN considerations include requirements for throughput/delay characteristics, packet error rate, and fairness. In addition, LANs are applied in an environment with burst-type traffic where one station gets the whole "bandwidth".

The number of installed access points for indoor wireless LANs has to be as low as possible to save infrastructure cost consistent with guaranteeing the required fairness and throughput/delay performance at peak-load. With indoor wireless LANs, only one channel is used for both uplink and downlink transmissions. This single channel structure, as well as the packet switching nature of this type of LAN, implies that the co-channel interference scenario is different from that of cellular telephone systems.

In particular, the difference between wireless LANs based on IEEE 802.11 DSSS (direct sequence spread spectrum) and DS/CDMA (direct sequence/code division multiple access) systems is fundamental. With DS/CDMA systems, the different codes provide sufficient separation between individual links which share the same band as long as the receive levels don't diverge too much. With indoor wireless LANs, the maximum level of interference present during the transmission of a frame is dominated by the interference from one neighbor cell station. Such a neighbor cell interference potentially is present for a short period, as occurs at the transmission of an acknowledgement frame (ACK). The IEEE 802.11 CSMA/CA control technique does not apply an individual carrier sensing before an ACK is transmitted.

Figure 3C:
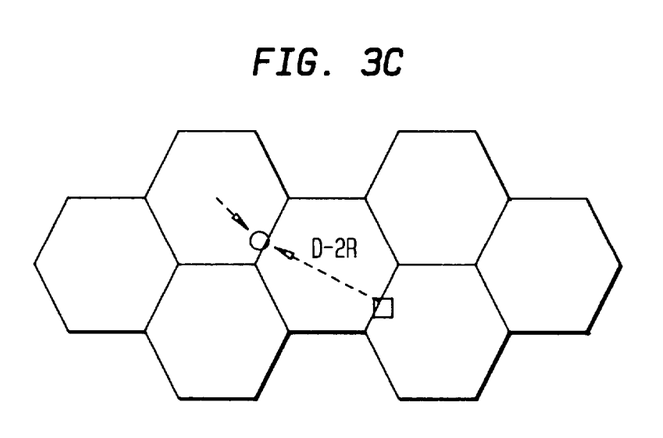
FIG. 3C shows an illustration of worst case interference distance for a wireless LAN.

Referring to FIG. 3C, the worst case interference distance for wireless LANs is shown, assuming the same channel is used for the uplink and downlink. The worst case distance scenario, where one interferer dominates, gives a CSIR requirement with $$CSIR = \left(\frac{D-2R}{R}\right)^\gamma = (a-2)^\gamma$$

which leads to an MRE (medium reuse efficiency) of $$MRE = \left(\frac{1}{2 + CSIR^{\frac{1}{\gamma}}}\right)^2.$$

The duration of a worst interference presence is less relevant, because when the received frame is mutilated, the number of erroneous bits does not matter. For transmitting data packets, the target FER (frame error rate) has to be better than $10^{-2}$ during transmission of 1 Kbyte packets.

This FER requirement is in contrast to the requirement for cellular telephone systems where the BER (bit error rate) has to be better than $10^{-3}$. For an IEEE 802.11 DSSS receiver, a detection margin with regard to noise corresponds to a BER better than $10^{-6}$. However, the capture effect properties of an IEEE 802.11 DSSS receiver do not correspond to the detector margins used with respect to noise.

The IEEE 802.11 DSSS is based on the following 11-chip Barker sequence +1, −1, +1, +1, −1, +1, +1, +1, −1, −1, −1. This sequence is used as a PN (pseudo sequence and the symbol duration corresponds to the duration of the 11-chips. The 11-chips spreading makes the occupied bandwidth larger. The DSSS spreading increases the effective bandwidth from 1 MHz to 11 MHz. At the same time, the 11-chips spreading reduces the impact of multipath fading. With an indoor channel having a delay spread of 100 ns and selecting one out of two antennas, the fading margin required for an outage of 1% is reduced to 4 dB, whereas the required fading margin would be 9 dB for a 1 MHz system.

Figure 4:
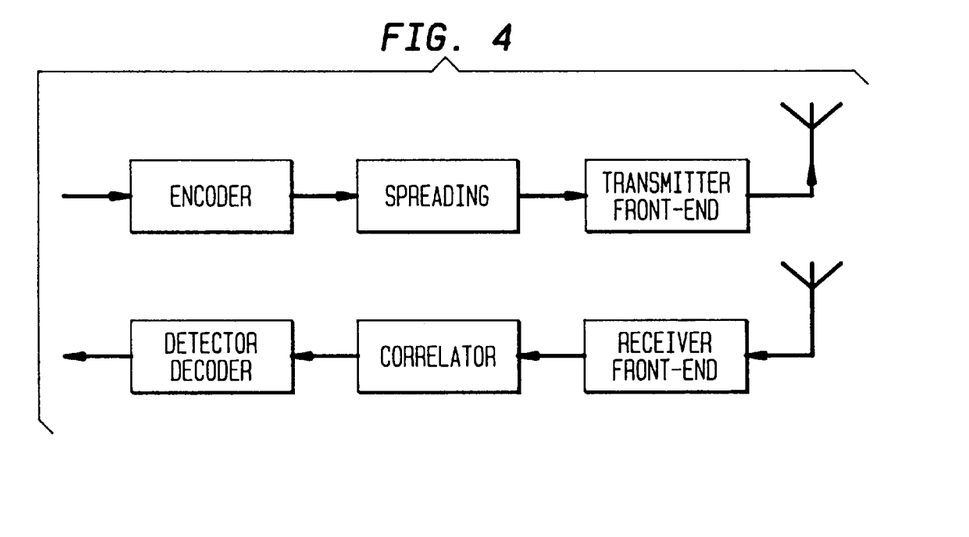
FIG. 4 shows a basic block diagram of a DSSS transceiver.

Referring to FIG. 4, a basic block diagram of a DSSS transceiver is shown. The transmitter section includes an encoder, a spreader, and a transmitter front-end. The receiver section includes a receiver front-end, a correlator, and a detector decoder.

Figure 5A:
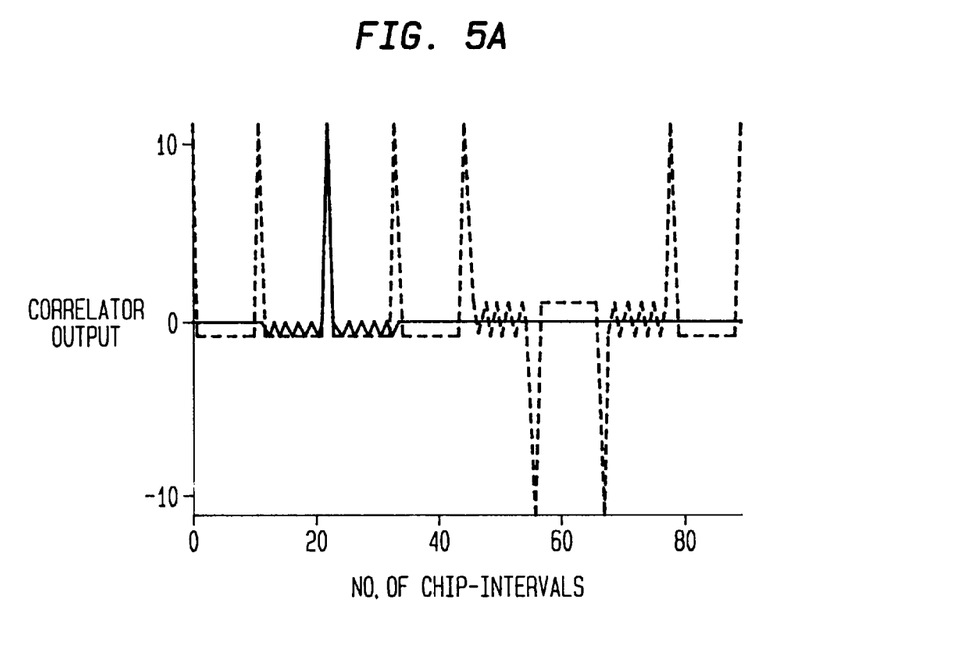
FIG. 5A shows a correlator output at a single symbol (solid line) and successive symbols (dashed line).

Referring to FIG. 5A, the receiver correlator output spike waveform is shown for the ideal case, i.e., an air-channel with no degradation by filtering. The output at a single symbol is shown as a solid line. The output for successive symbols is shown as a dashed line.

Figure 5B:
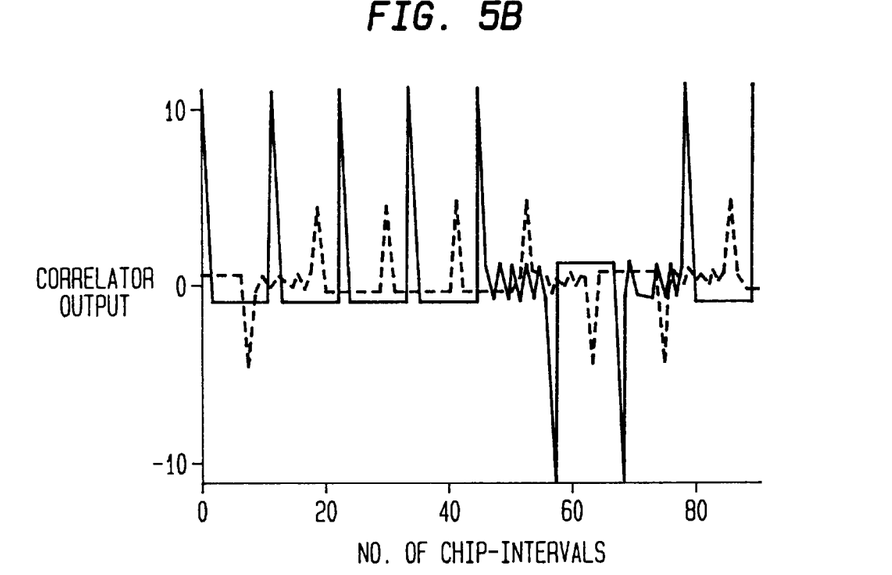
FIG. 5B shows a correlator output with desired signal contribution (solid line) and interferor signal contribution (dashed line).

Referring to FIG. 5B, the receiver correlator output spike waveform is shown which demonstrates the presence of a co-channel interferor. The correlator output with the desired signal contribution is shown as a solid line, whereas the interferer signal contribution is shown with a dashed line. In the most likely case, the spike waveform contribution from the interferer falls between the spike-waveform peaks of the desired signal. A clock drift of X ppm (i.e., the difference between the clocks in the desired signal transmitter and the clocks in the interferor transmitter) corresponds to a shift-in-time of 5X ns for a typical packet transmission time of 5 ms. X has a maximum of a few tens (ppm) for low cost clock circuitry. Therefore, it is unlikely that the interferor spike-waveform peak will shift during a packet transmission time to a position-in-time with overlapping spike-waveform peaks.

Figure 5C:
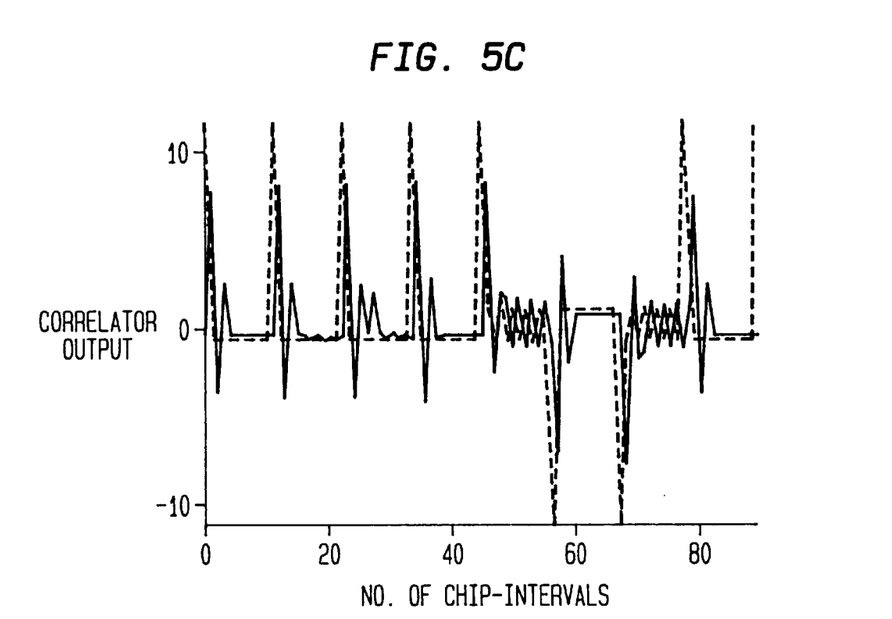
FIG. 5C shows a correlator output at a significant channel degradation (solid line) and at an ideal channel (dashed line).

Referring to FIG. 5C, a degradation due to a channel which introduces delay spread is shown. The correlator output at significant channel degradation is shown as a solid line, whereas the correlator output of an ideal channel is shown as a dashed line. An allowed margin with regard to the interferor level and clock drift decreases with an increase in delay spread. Imposing more severe requirements for the clock circuitry benefits the MRE (medium reuse efficiency), since the probability of non-overlap for the peaks during the full reception of a frame increases. However, the most threatening situation is introduced by the acknowledgment mechanism. For transmission of an acknowledgement frame (ACK), there is no individual carrier sensing applied, resulting in increased risk of strong interference. The shift-in-time during the 250 µs period during which an ACK interferes is only 0.25X ns. This 0.25X ns shift-in-time is, for typical values of X (a few tens ppm), very small compared to the 1 µs between two successive symbol-peaks in the spike-waveform.

IEEE 802.11 DSSS specifies twelve channel frequencies in the 2.4 GHz band. However, there are only a few non-overlapping channels that can operate simultaneously without interfering each other. The allowed CSIR and ASIR (adjacent channel signal-to-interference ratio) depend on the particular transceiver implementation. In addition, the CRS (carrier sense) function is important for proper CSMA/CA behavior. The medium busy (MBUSY) state occurs when the receive level is above the CRS threshold. IEEE 802.11 DSSS describes an upper limit for the CRS threshold which is dependent on the applied transmit power. For a transmit power of 17 dBm (50 mW) or below, this threshold is −70 dBm. For higher transmit power, one of the lower (more sensitive) thresholds must be applied. U.S. Pat. No. 5,553,316 (Power Control Method in a Wireless Communication System) details a method of determining a transmit power level and its associated CRS threshold level.

Figure 6A:
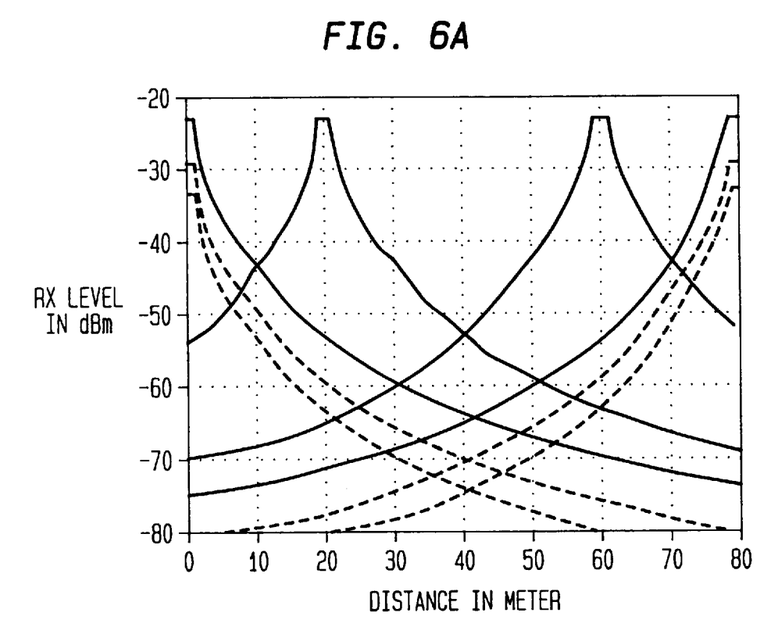
FIG. 6A shows receive levels (solid lines) around access points at positions 0 and 80 meters and stations at 20 meters from the access points and reference levels (dashed lines) for a 6 dB and a 10 dB margin with respect to the signal from the access points.
Figure 6B:
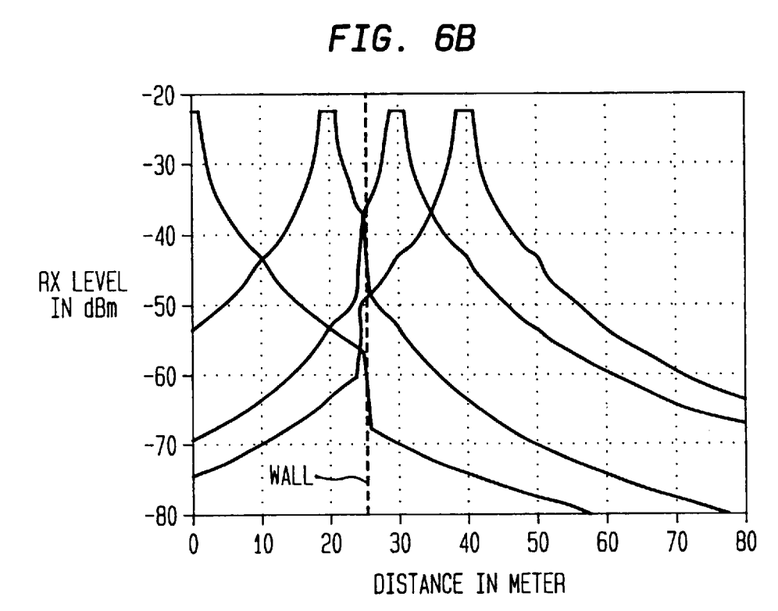
FIG. 6B shows receive levels (solid lines) around access points at positions 0 and 40 meters and stations at 20 meters and 10 meters from the access points in the presence of a 10 dB wall loss.

Referring to FIGS. 6A–6B, receive levels for a scenario with an exponential path loss of $\gamma=3.5$ (10.5 dB/octave) for distances above 10 meters are shown. At a CRS threshold of −75 dBm, the transmissions from the access points at 0 and 80 meters are received well by the stations within a 20 meter distance when the required CSIR is 10 dB or less. In FIG. 6A, an ACK is returned from the station at 20 meters towards the access point at 0 meters which does not disturb an ongoing transmission by the access point at 80 meters to the station at 60 meters in the neighbor cell.

More sensitive CRS thresholds can be applied for larger cell sizes adapted according to the exponential path loss which result in a figure with the same form as shown in FIG. 6A. So, too, less sensitive CRS thresholds can be applied for smaller cell sizes adapted according to the exponential path loss which also result in a figure with the same form as shown in FIG. 6A. In FIG. 6B, a 10 dB wall loss is between the two neighbor cells. In this situation, the ACK from the station at 30 meters towards the access point at 40 meters disturbs the reception of the transmission from the access point at 0 meters by the station at 20 meters.

The applied CRS threshold leads to a distinction between "sharing" and "reuse". All stations (and access points) around an actively transmitting station (or access point) measure the receive level of the DSSS signal. When the receive level is above the CRS threshold, such a station cannot start a transmission and has to defer the packet transmission. Such deferments are not coupled to the cell boundaries. If we look at FIG. 6A, transmissions around the access points at 0 and 80 meters start independently for a cell size radius of 20 meters and a CSIR around 8 dB. At a smaller distance between the access points, the medium is shared frequently. In FIG. 6B, we see the impact of disturbed symmetry, which gives some risk of errors for stations at one edge of the cell around the access point at 0 meters.

The optimum CRS threshold is dependent on the target receive level at the edge of the cell, the required CSIR, and path loss conditions (path loss coefficient $\gamma$, multipath fading), packet traffic (type of offered load, mixture of packet sizes), and performance criteria (throughput, tolerable transmission delay).

IEEE 802.11 DSSS specifies bit rates of 1 and 2 Mbits/s. The allowable SNR and CSIR values for reliable transmission of data packets are dependent on the bit rate. The transceiver performance with regard to SNR and CSIR are dependent on the implementation and presence of various signal processing functions such as differential or coherent detection, channel matched filtering, system noise, and processing accuracy. When the transceiver implementation is based on enhanced signal processing with phase correction and frequency offset compensation (coherent detection) and channel matched filtering, then the system degradation that occurs at indoor channels with typical delay spread can be approximated at 1–2 dB with respect to the theoretical BER vs. SNR curves.

For IEEE 802.11 DSSS, we distinguish between two types of capture effects. The required CSIR depends on which signal arrives first: the desired one or the interfering one. A capture ratio (or CSIR) of 2 to 3 dB for the situation at which an interfering signal arrives during the desired transmission is feasible. If the desired signal arrives later than the interferor signal, a higher capture ratio is required to let the receiver retrain well.

As shown in FIG. 6A for a path loss coefficient γ=3.5, the combination of a transmit power level of 17 dBm and a CRS threshold of −75 dBm yields reliable operation at distances up to 20 meters for required CSIRs of 10 dB or better (i.e., more robust), at distances up to 24 meters for CSIRs of 6 dB or better, and at distances up to 30 meters for ideal capture properties (CSIR=0 dB). Referring momentarily to FIG. 5B, the arrival of an interferer which produces a spike-waveform peak that falls between successive spike-waveform peaks of the desired signal does not harm the desired signal reception as long as this interference signal strength meets the required CSIR. The transceiver design is optionally optimized for robustness against co-channel interference with regard to the desired signal spike-waveform tracking. Such a robustness is preferable in relation to interference by transmission of ACKs having a short duration and no individual CRS function. In theory, the later arriving interferor could be even stronger.

IEEE 802.11 DSSS specifies BPSK and QPSK. In addition, proprietary modes with M-PSK and QAM schemes can be applied that provide higher bit rates by encoding more bits per symbol. A transceiver implementation for such modulation schemes yields SNR performance figures which are a few dB worse than what the theoretical curves show. Because of the nature of DSSS, these higher bit rates also provide good capture effect properties in co-channel interference scenarios as described above with respect to FIGS. 6A–6B. An automatic rate selection scheme based on the reliability of the individual uplink and downlink can optionally be applied. An example of a basic rate adaptation scheme is that after unacknowledged packet transmissions, the rate falls back, and after a specified number (e.g., 10) of successive correctly acknowledged packet transmissions, the bit rate goes up.

The transmissions from the access point in the center of a cell to a station in the outer part are the most sensitive to co-channel interference from a neighbor cell. For path loss that corresponds fully to the exponential curves as in FIG. 6A, the applied CRS threshold yields enclosed areas for which a certain CSIR is expected. In practice, the presence of multipath fading and hard walls disturb the ideal case curves.

When two access points don't receive each other above the CRS threshold, they are allowed to transmit at the same time. In this case, the required CSIRs that depend on the applied bit rates are very relevant. The occurrences of the various CSIR situations depend on the network load in the neighbor cells. The capture effect robustness and the traffic process permit accommodation to the bit rate used for the uplink and downlink. At lower loads in the neighbor cells, the highest bit rate can be used more often. At higher loads, the transmissions from the access point to stations at the outer part of the cells is often done at fallback rates due to the mutilation of transmissions by interference. In practice, the network load for LANs with modern client-server applications includes a majority of burst-type traffic characterized by transmission bursts over individual links with low activity during most of the time. Therefore, the higher bit rate is preferably used most of the time, while with high loads in the neighbor cells, as evoked by test applications, the system switches to lower rates in the outer part of the cell.

Only a few independent DSSS channels are available in the 2.4 GHz ISM band for simultaneous operation. Therefore, some strategy must be followed to obtain a good medium reuse figure per channel. Two such strategies are (1) establishing a CRS threshold based on the cell size and required CSIR; and (2) using a fixed CRS threshold.

The MRE and required CSIR derived from the formulas described above for indoor wireless LANs are optionally applied at a high density of access points and small cells. However, such an application potentially implies a CRS threshold that is above the IEEE 802.11 DSSS limit of −70 dBm or a transmit power level that is below 17 dBm, because otherwise the CRS threshold would be the limiting element. In a fully filled two-dimensional space (i.e., a large multi-cell area), the bit rate of 2 Mbit/s and a minimum required CSIR of 3 dB result in a throughput density of 0.2 Mbit/s per cell per channel. An automatic rate selection scheme combined with additional bit rates of 3 or 4 Mbit/s produces higher rate operation in the inner cell part as well as during the period that no significant co-channel interference exists. Such an automatic rate selection allows a throughput density of 0.3 Mbit/s per cell per channel.

When a CRS threshold of −70 dBm and a transmit power of 17 dBm are applied, the addition of more access points with smaller cells causes sharing between nearby neighbor cells defined as less than 60 meters at γ=3.5. Stations therefore associate with a closer access point, while the interference from further away cells becomes relatively lower (i.e., better actual CSIRs). Therefore, a higher bit rate can be used in the outer parts of a cell, but only a single transmission activity can exist within a radius of 60 meters (0.94 hectare). A throughput density of 4 Mbit/s per hectare per channel is possible at the proprietary bit rates of 3 and 4 Mbit/s, in addition to the basic bit rates of 1 and 2 Mbitls, when coupled with automatic rate selection. In practice, the presence of obstructions such as concrete walls and floors provides additional isolation.

Based on the above discussion, a CRS threshold based on both the target receive level at the cell edge and the required CSIR is preferable for optimum medium reuse in a typical indoor environment. The DSSS signal constellation provides very advantageous capture effect properties which can be exploited by a dedicated design with respect to ACKs in a neighbor cell. A high access point density is needed for realization of a high throughput density. An automatic rate selection can be combined with the application of proprietary bit rates of 3 and 4 Mbit/s as well as the basic 1 and 2 Mbitls. Automatic rate selection provides fall-forward when reliable connections exist and fall-back in the presence of strong co-channel interference. Automatic rate selection provides dynamic adaptation of bit rate to interference depending on positions and load. Without the limitations prescribed by IEEE 802.11 for CRS threshold and transmit power level, a contribution to the throughput density of 0.3 Mbit/s per cell for each available channel is possible in a large multi-cell environment.

For PCMCIA based wireless LAN cards, a typical transmit power level is 17 dBm. At this transmit power level, IEEE 802.11 DSSS prescribes a CRS threshold of −70 dBm or lower. A throughput density up to 4 Mbit/s per hectare per channel is possible with these settings when coupled with a high density of access points. A lower CRS threshold is preferable with a lower density of access points and cell sizes having a radius of more than 20 meters. This lower CRS threshold depends on the path loss coefficient and the required CSIRs for the supported bit rates.

Figure 7:
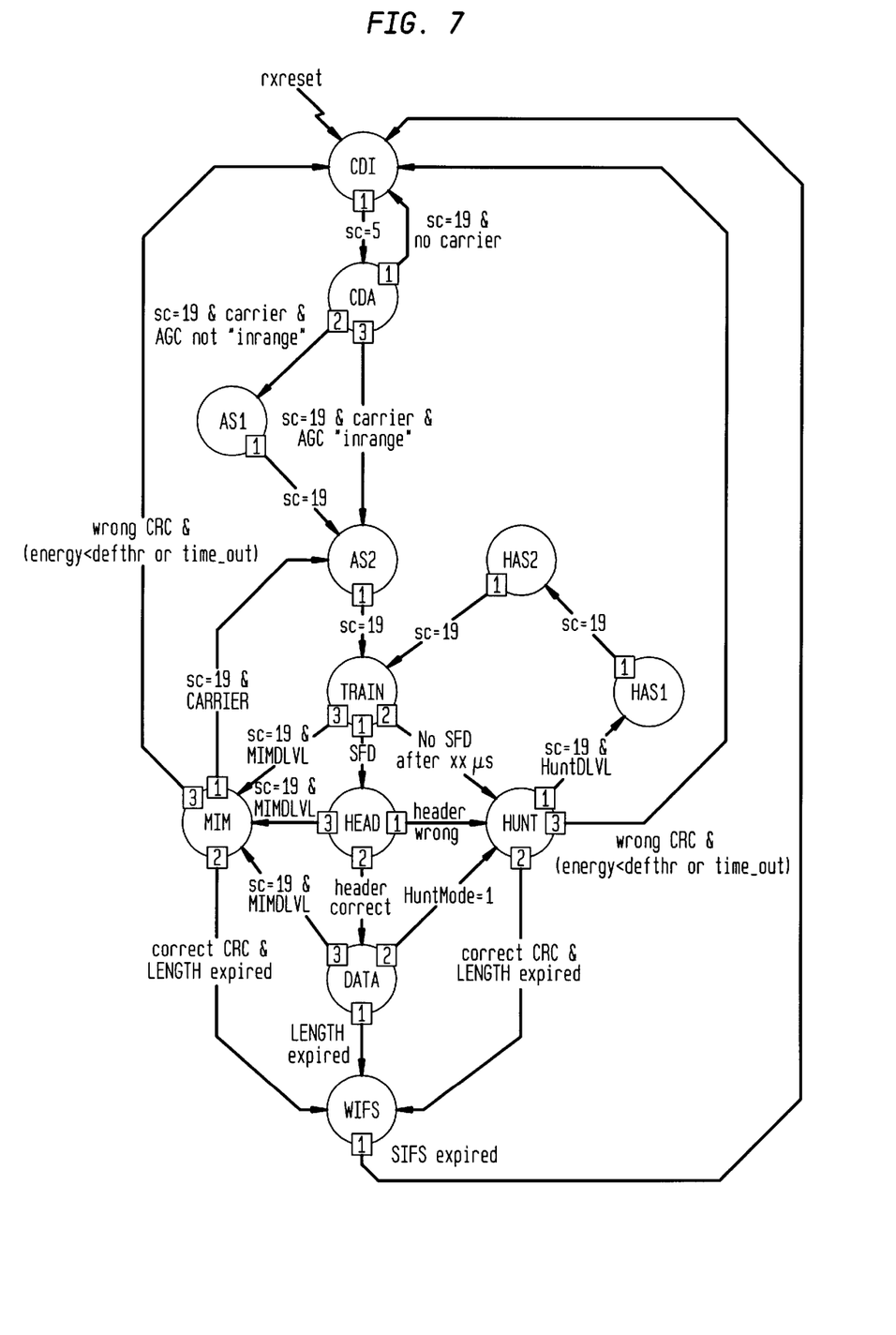
FIG. 7 shows a receiver state machine according to an embodiment of the present invention.

Referring to FIG. 7, a state machine 10 defines how an embodiment of a receiver for a station on a wireless LAN according to the present invention reacts to input data in normal receive mode, message in message mode, and message in a message hunt mode. Detailed internal control signals are not given.

In normal receive mode ("Normal Mode"), when a first received transmission contains a matching destination address (contained in the MAC header field) signifying that the station is the intended recipient, or when the address of the received transmission has not been decoded, the receiving station continues with processing the communication until the communication is fully received or until a second received transmission exceeding a specified threshold level arrives. Upon arrival of the second transmission which exceeds the specified receive level increase threshold, the receiver transitions to the message in message mode ("MIM Mode"). The receiver is incapable of handling the first received transmission without bit errors during the arrival of the second received transmission.

When the first received transmission does not contain a matching destination address, the station watches for an increase of the receive level above the specified threshold level which indicates a potential message addressed to the station. The receiver enters the message in message hunt mode ("HUNT Mode"). When such a receive level increase above the specified threshold occurs, the receiver begins retraining to automatically focus on the strongest received transmission. This strongest received transmission is received correctly only if the minimum required capture ratio is met.

In Normal Mode, the receiver follows the typical states in order to demodulate the received data properly. Meanwhile, a process is watching the energy level indicator and triggers the MIM Mode when a jump in energy is detected. In HUNT Mode, the receiver is in an idle state waiting for the current message to finish. At the same time, a process is watching the energy level indicator and triggers the Hunt Mode Training State when an energy jump is detected.

The thresholds for receive level increase in MIM Mode and HUNT Mode are based on the capture properties of a receiving station. The threshold for a jump in the MIM Mode (MIMDLVL) is based on the capability of a receiver to continue reliable data detection for a first transmission after being trained well, although a second transmission which starts later will interfere. The threshold for a jump in the HUNT mode (HUNTDLVL) is based on the capability of a receiver to train well and make reliable data detection for a second starting transmission, even when a first started transmission, which is not relevant for the receiver in question, continues to be present and gives background interference all the time.

The following is a description of the states CDI, CDA, AS1, AS2, TRAIN, HEAD, DATA, WIFS, MIM, HUNT, HAS1, and HAS2 of state machine 10. A slot counter 'sc' (not shown) is maintained parallel to receiver state machine 10. The slot counter counts from 0 to 19 and is incremented once per symbol interval (one $\mu$s).

CDI (Carrier Detect Inactive) State

In this state, the receiver is more or less idle. The carrier detector is disabled. The AGC is inactive. This state is passed during 5 symbol intervals to allow various delays such as transmitter power stage rampup and MAC decision.

CDA (Carrier Detect Active) State

In this state, the carrier detector and AGC are active. At the end of the slot (slot counter=19) the next state is determined by the status of the carrier detector and AGC. The carrier is detected when the DSSS modem signal is present which is recognized by the carrier detection circuitry and the energy level as measured by the AGC exceeds the carrier detect threshold. When no carrier is detected, the energy levels of the current and the previous slot are stored. This information can be used to determine the silence level.

Figure 8:
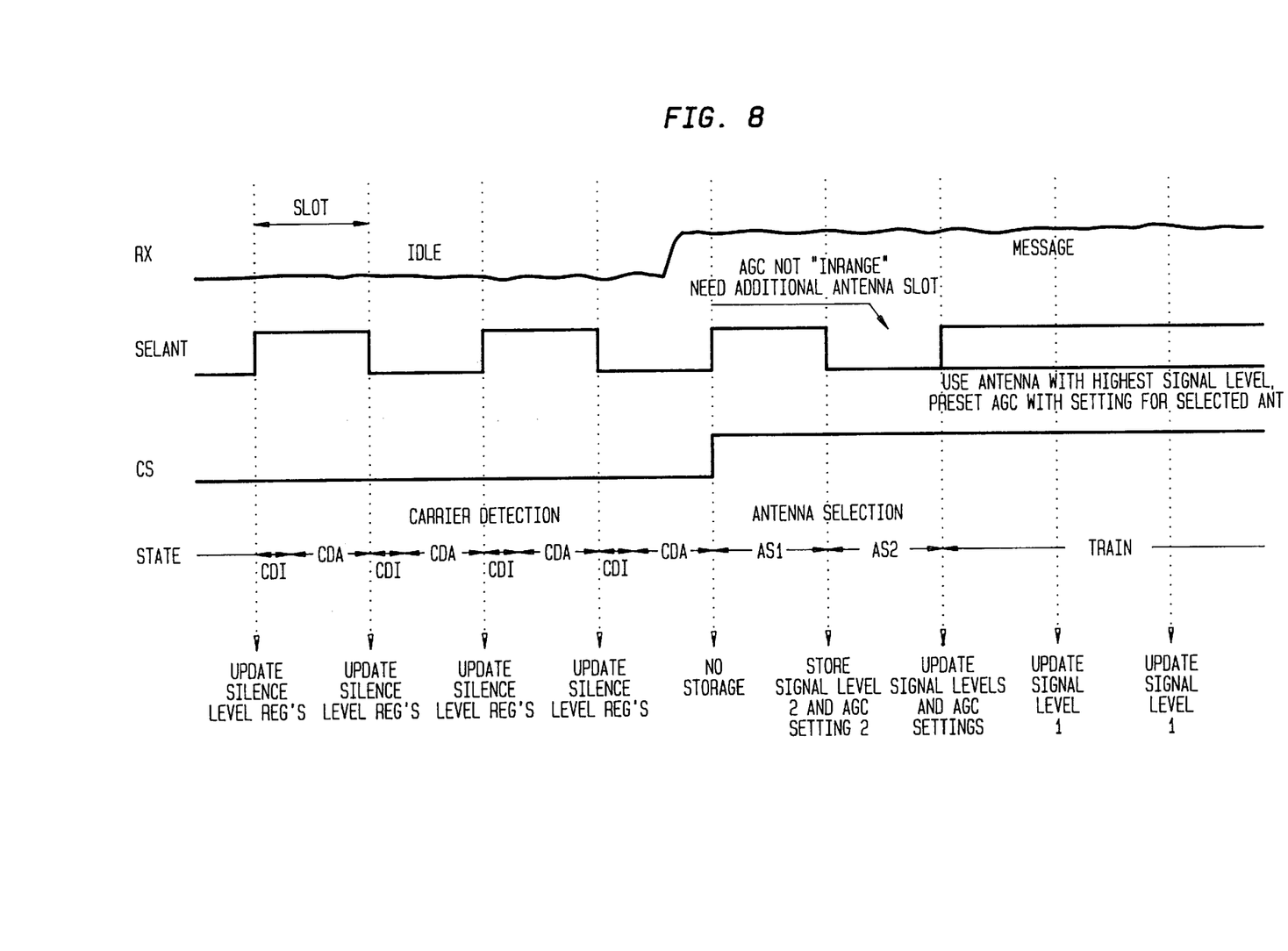
FIG. 8 shows a slot diagram of a CDA (Carrier Detect Active) State of the receiver state machine of FIG. 7 when an AGC is not fully settled.

When a carrier is detected but the AGC is not fully settled (inrange is '0'), the energy measurement in this slot is not valid.

Referring to FIG. 8, when a carrier is detected and the AGC is settled (inrange is '1'), the energy measurement in this slot is reliable enough to use. This slot is used as the first antenna selection slot for choosing one out of two antennae. The AGC setting and energy level are stored.

When a carrier is detected and the energy level is above the defer threshold, MBUSY is put on.

AS1 (Antenna Select 1) State

In this state, the energy level of the current antenna is measured. At the end of the slot the other antenna is selected and the state machine jumps to the second antenna select state AS2.

AS2 (Antenna Select 2) State

In this state, the energy level of the current antenna is measured. At the end of the slot the antenna with the highest signal level is selected, and the state machine jumps to the receiver training state (TRAIN). At the end of this AS2 state, the signal levels and AGC settings for both antennae are stored.

TRAIN (Receiver Training) State

In this state, the receiver digital processing circuitry core is trained, the AGC is fixed, and energy level measurements continue. After the receiver digital signal processing circuitry for symbol timing, frequency offset compensation, and channel estimation are trained, the data detection is sufficiently reliable. The first part of the IEEE 802.11 DSSS frame header which contains the SFD (start frame delimiter) can be expected between 48 $\mu$s and 124 $\mu$s after the antenna selection is completed. The unknown moment (with respect to the local antenna slotting) at which the remote station starts transmission of the fixed format of the IEEE 802.11 DSSS preamble/header, along with the possibility that one antenna gets a very low signal due to fading, give this margin-in-time for the moment at which the SFD can be expected.

On detection of the SFD, the state machine jumps to state HEAD. When the SFD is not detected in the 'SFD detection window', the state machine jumps to state HUNT. When the LENGTH field can not be determined, the receiver uses the value 'MaxLength'. If, in this state, the energy level increases more than a 'message in message delta level' (MIMDLVL), the receiver assumes it is another message and jumps to the MIM state. In an alternative embodiment, the received data are stored in the call sign buffer until the SFD detection.

The energy level of the incoming message is updated in the register signal_level_selected every slot. Bit 'Hunt-Mode' is kept reset until the DATA phase.

State Transitions:
1. Condition: SFD detected
    Actions: PDA on,
        receive clock at 1 MHz
        goto state HEAD.
2. Condition: SFD window passed Actions: cnt:=MaxLength (protection timer)
goto state HUNT.
3. Condition: end of slot and energy level>signal_level_1+MIMDLVL
Actions: enable carrier detector and AGC,
goto state MIM.

HEAD (IEEE header) State

In this state, the IEEE 802.11 DSSS header is processed. The receiver clock is preferably at 1 MHz. The CRC checker is enabled. The CRC shift register is preset to all ones. The first 8 bits after SFD are the SIGNAL field. The SIGNAL field is used to determine the rate of the data part of the message. Valid values are 0Ah=1 Mbit/s and 14h=2 Mbit/s. The next 8 bits (SERVICE field) are not used. The following 16 bits, the LENGTH field, are stored. The value of LENGTH indicates the length of the message in microseconds ($\mu s$).

The SIGNAL, SERVICE, and LENGTH fields are processed by the CRC checker using the polynomial $X^{16}+X^{12}+X^5+1$. The result is compared with the last 16 bits of the IEEE 802.11 DSSS header. When the header is valid, the receiver switches the receive clock to the rate determined by the SIGNAL field. If a non-valid header is received (e.g., wrong CRC or SIGNAL field out of spec), the receiver jumps to the HUNT state.

If the energy level increases more than the 'message in message delta level,' (MIMDLVL), the receiver assumes it is another message and jumps to the MIM state.

State Transitions:
1. Condition: end of header and wrong CRC or SIGNAL field not (0Ah or 14h)
   Actions: PDA off, receive clock off, receive data '0'
   goto state HUNT.
2. Condition: end of header and correct CRC
   Actions: if SIGNAL=14h then
      data rate is 2 Mbit/s
      else
      data rate is 1 Mbit/s
      end if,
      keep LENGTH,
      goto state DATA.
3. Condition: end of slot energy level>signal_level_1+MIMDLVL
   Actions: PDA off, receive clock off, receive data '0',
   enable carrier detector and AGC,
   goto state MIM.

DATA (data phase) State

In this state, the data (MPDU) is received. The receiver is transparent to the data because it does not use it. The length of this state is determined by the value of 'LENGTH'. Every microsecond ($\mu s$), a counter is incremented until it reaches LENGTH, thereby signaling the end of the message. If, in this state, the energy level increases more than the 'message in message delta level' (MIMDLVL), the receiver assumes it is another message and therefore then jumps to the MIM state. The MAC controller uses the address information of the source and destination stations. When the MAC determines that the destination address (which could be a group address) does not match with (its own) the address of the receiving station, the MAC supplies a command to the transceiver to go into 'HuntMode.' Note that the bit 'HuntMode' can only be set in this state. In the data phase state, the end of message is determined by the LENGTH field only, and not by carrier loss or energy drop.

State Transitions:
1. Condition: cnt=LENGTH
   Actions: PDA off, receive clock off, receive data '0',
   cnt:=0,
   goto state WIFS.
2. Condition: HuntMode=
   Actions: PDA off, receive clock off, receive data '0',
   goto state HUNT.
3. Condition: end of slot and energy level>signal_level_1+MIMDLVL
   Actions: PDA off, receive clock off, receive data '0',
   enable carrier detector and AGC,
   goto state MIM.

WIFS (Wait short Inter Frame Space) State

This state is a wait state between two messages. At the end of this state, the slotting system is reset such that all stations which receive the transmission in question restart their slotting in synchronization. The state machine jumps to the CDI state ready for the next message. A counter is incremented every microsecond ($\mu s$) until it reaches the parameter 'SIFS'.

MIM (Message In a Message) State

Figure 9:
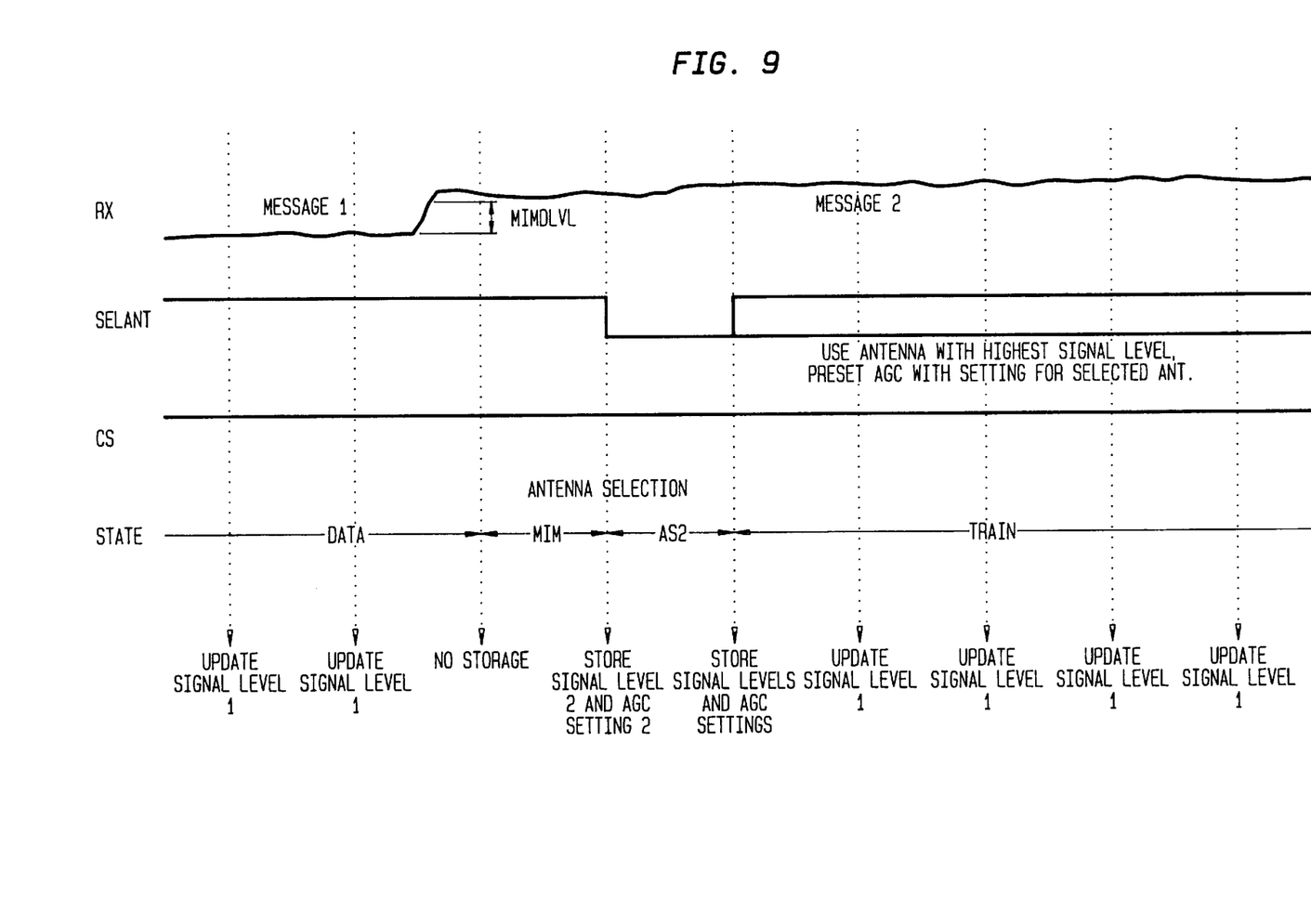
FIG. 9 shows a slot diagram of a MIM (Message in Message) State of the receiver state machine of FIG. 7.

This state is reached after the state machine detects an energy increase on the selected antenna, whether caused by another message or an interferor. Referring to FIG. 9, after detection of the energy increase, the receiver measures the energy level and the carrier detect status at the selected antenna in the next slot. If a carrier signal is detected, then the increase in energy level is from a second message. The state machine again does antenna selection followed by retraining on the new situation. The current slot is used as the first antenna selection slot, the AGC setting and the energy level are stored, and the state machine jumps to AS2 for the second antenna selection slot. MBUSY stays on.

If there is no carrier signal detected, then the level increase is caused by an interferor. The receiver stays in this state until either a carrier is detected or until the end of the first message. When the CRC of the first message is correct, the end of the first message is determined by the message length counter (cnt). The state machine then jumps to the WIFS state. When the CRC of the first message is wrong or when the SFD is not detected within the time window, the state machine goes back to the CDI state either after the energy level drops below the defer threshold or until the message length counter expires (length has been set to its maximum in this case). Under this last condition, MBUSY stays on, and in every slot, the other antenna is selected for validation if another message does not arrive before the message length counter expires.

State Transitions:
1. Condition: end of slot and carrier detected
   Actions: disable carrier detector,
      AGC_unselected:=current AGG setting,
      signal_level_unselected:=energy level,
      select other antenna,
      goto state AS2.
   Note that the AGC signal 'inrange' is not used.
2. Condition: CRC correct and cnt=LENGTH
   Actions: MBUSY off,
      goto state WIFS
3. Condition: CRC wrong and (energy level<defer threshold or cnt=MaxLength)
   Actions: MBUSY off,
      goto state CIDI HUNT (Message in a Message Hunt Mode) State In this state, the receiver waits for an energy increase on one of the two antennae. The antenna with the highest delta level is used to receive the message. The AGC stays fixed.

Figure 10:
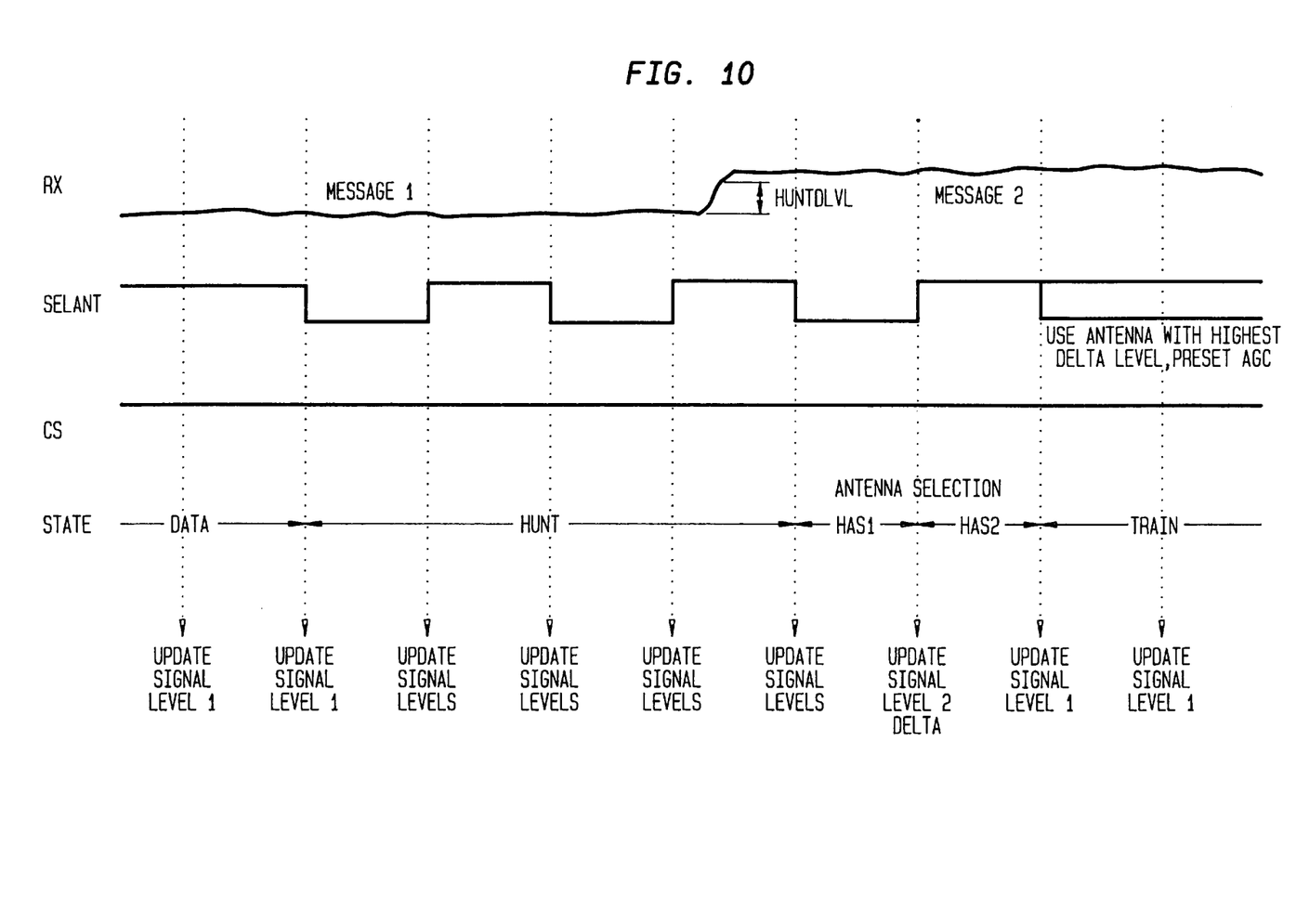
FIG. 10 shows a slot diagram of a HUNT State of the receiver state machine of FIG. 7.

Referring to FIG. 10, at the end of a slot, the current energy level is stored and the new delta level (the current level minus the level of two slots ago) is determined. It is assumed that another message is being received when the delta level is higher than HUNTDLVL and the carrier is detected. The next two slots are used to determine which antenna has the highest delta level. When the energy level increase does not occur or when the increase occurs but no carrier is detected (i.e., due to an interferor), the receiver jumps to state WIFS when the message length counter expires in case the CRC of the first message is correct. When the CRC is wrong or when the SFD is not detected, the state machine returns to the CDI state either after the energy level drops below the defer threshold or until the message length counter expires (the length is set to max. in this case).

At the end of each slot, the signal levels of the current and previous slots are updated and the other antenna is selected.
State Transitions:
1. Condition: end of slot and carrier detected and current energy level−signal_level_2_slots_ago>HUNTDLVL
   Actions: enable AGC,
      goto state HAS 1
2. Condition: CRC correct and cnt=LENGTH
   Actions: MBUSY off,
      goto state WIFS
3. Condition: CRC wrong and [(energy level<defer threshold) or (cnt=MaxLength)]
   Actions: MBUSY off,
      goto state CDI HAS1 (Hunt mode Antenna Select 1) State
In this state, the delta energy level at the current antenna is measured. At the end of the slot, the other antenna is selected and the state machine jumps to state HAS2, the second hunt mode antenna select.

HAS2 (Hunt mode Antenna Select 2) State
In this state the delta energy level of the current antenna is measured. At the end of the slot, the antenna with the highest signal level is selected, and the state machine jumps to the training state.

It is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method for operating a receiver of a station in a wireless local area network using a common wireless communication channel and employing a CSMA/CA (carrier sense multiple access with collision avoidance) protocol, comprising the steps of:

detecting a message;

determining when said message is addressed to said station;

demodulating said message when said message is addressed to said station;

detecting a first energy increase above a first specified level when said message is being demodulated;

detecting a carrier upon detection of said first energy increase;

retraining upon detection of said carrier;

detecting a second energy increase above a second specified level;

detecting said carrier when said second energy increase is detected; and retraining upon detection of said second energy increase and detection of said carrier, wherein there is no transmission of a collision detect signal either after detecting said first energy increase or after detecting said second energy increase.

2. A method according to claim 1, further comprising:

determining said first specified level; and determining said second specified level.

3. A receiver for a station in a wireless local area network using a common wireless communication channel and employing a CSMA/CA (carrier sense multiple access with collision avoidance) protocol, comprising:

first detecting means for detecting a message;

means for determining when said message is addressed to said station;

means for demodulating said message when said message is addressed to said station;

second detecting means for detecting a first energy increase above a first specified level when said message is being demodulated;

third detecting means for detecting a carrier upon detection of said first energy increase;

first retraining means for retraining upon detection of said carrier;

fourth detecting means for detecting a second energy increase above a second specified level;

fifth detecting means for detecting said carrier when said second energy increase is detected; and second retraining means for retraining upon detection of said second energy increase and detection of said carrier, wherein the receiver does not include means for transmitting a collision detect signal after detecting either said first or said second increase in energy.

4. A receiver according to claim 3, further comprising:

first determining means for determining said first specified level; and second determining means for determining said second specified level.

* * * * *